United States Patent
Jung et al.

(10) Patent No.: US 10,087,941 B2
(45) Date of Patent: Oct. 2, 2018

(54) EXHAUST-GAS TURBOCHARGER AND METHOD FOR PRODUCING A FLOW HOUSING OF AN EXHAUST-GAS TURBOCHARGER

(71) Applicant: BorgWarner Inc., Auburn Hills, MI (US)

(72) Inventors: Martin Jung, Kirchheimbolanden (DE); Marc Gugau, Freilaubersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 272 days.

(21) Appl. No.: 14/764,617

(22) PCT Filed: Jan. 28, 2014

(86) PCT No.: PCT/US2014/013321
§ 371 (c)(1),
(2) Date: Jul. 30, 2015

(87) PCT Pub. No.: WO2014/123720
PCT Pub. Date: Aug. 14, 2014

(65) Prior Publication Data
US 2015/0369251 A1    Dec. 24, 2015

(30) Foreign Application Priority Data

Feb. 8, 2013    (DE) .................. 10 2013 002 299

(51) Int. Cl.
*F04D 25/04*    (2006.01)
*F01D 9/02*    (2006.01)
(Continued)

(52) U.S. Cl.
CPC ........... *F04D 25/045* (2013.01); *F01D 9/026* (2013.01); *F02B 37/00* (2013.01); *F02B 37/02* (2013.01);
(Continued)

(58) Field of Classification Search
CPC .... F04D 25/024; F04D 29/441; F04D 29/624; F04D 29/628; F05D 2230/10
See application file for complete search history.

(56) References Cited

U.S. PATENT DOCUMENTS

2006/0013707 A1 *    1/2006    Oklejas .................. F01D 15/08
417/407
2006/0110249 A1    5/2006    Williams et al.
(Continued)

FOREIGN PATENT DOCUMENTS

WO    WO2012058135 A2 *    5/2012    ............. F01D 17/20

OTHER PUBLICATIONS

Mitsubishi CNC M700 Series, Oct. 18, 2012, retrieved from Internet Archive Wayback Machine at https://web.archive.org/web/20121018201541/http://wwwf8.mitsubishielectric.co.jp/cnc/english/product/cnc_m700/cnc_m700_03.html.*
(Continued)

*Primary Examiner* — Patrick Hamo
(74) *Attorney, Agent, or Firm* — Eric L. Doyle; Stephan A. Pendorf; Patent Central LLC

(57) ABSTRACT

An exhaust-gas turbocharger (1) having a turbine housing (2) which has a turbine spiral (16); and a compressor housing (3) which has a compressor spiral (17). An internal flow-guiding spiral surface (18 or 19 respectively) of the turbine spiral (16) and/or of the compressor spiral (17) is machined in a material-removing process.

17 Claims, 3 Drawing Sheets

(51) Int. Cl.
*F02B 37/02* (2006.01)
*F02B 37/00* (2006.01)
*F02B 39/00* (2006.01)

(52) U.S. Cl.
CPC ........ *F02B 39/005* (2013.01); *F05D 2220/40* (2013.01); *F05D 2230/14* (2013.01); *F05D 2230/52* (2013.01); *F05D 2230/61* (2013.01); *Y02T 10/144* (2013.01); *Y10T 29/49991* (2015.01)

(56) References Cited

U.S. PATENT DOCUMENTS

| | | |
|---|---|---|
| 2008/0209905 A1 | 9/2008 | Petitjean et al. |
| 2011/0158796 A1 | 6/2011 | Albrecht et al. |
| 2012/0288367 A1 | 11/2012 | Boening et al. |
| 2013/0202431 A1* | 8/2013 | Heidingsfelder ....... F01D 17/20 415/220 |

OTHER PUBLICATIONS

International Search Report and Written Opinion in International Application No. PCT/US2014/013321, dated May 9, 2014.

* cited by examiner

EXHAUST-GAS TURBOCHARGER AND METHOD FOR PRODUCING A FLOW HOUSING OF AN EXHAUST-GAS TURBOCHARGER

BACKGROUND OF THE INVENTION

Field of the Invention

The invention relates to an exhaust-gas turbocharger and to a method for producing a flow housing of an exhaust-gas turbocharger.

Description of the Related Art

The flow housings of an exhaust-gas turbocharger are the compressor housing and the turbine housing. Said flow housings are normally produced as cast parts and respectively comprise a compressor spiral and turbine spiral which surround the compressor wheel and the turbine wheel respectively and end at a tongue.

In already-known exhaust-gas turbochargers, reworking of the internal flow-guiding spiral surface of the compressor housing or turbine housing is performed by turning only in exceptional cases, if the compressor wheel or the turbine wheel are damaged, the aim of said reworking being to increase the distance between the tongue and the wheel.

It is an object of the present invention to provide an exhaust-gas turbocharger of the type specified in the preamble of claim 1, the efficiency of which can be increased.

BRIEF SUMMARY OF THE INVENTION

This object is achieved by the features of claim 1.

By virtue of the internal flow-guiding spiral surface of the compressor spiral and/or of the turbine spiral being machined for example by milling, the original tolerance range of the tongue spacing is reduced by approximately 80%. Here, by contrast to reworking by turning, it is advantageously the case that no imperfections are generated. The narrower (milling) tolerance range is in this case shifted into the minus range of the original (casting position) tolerance range. The efficiency of the exhaust-gas turbocharger is thus increased.

The dependent claims contain advantageous further developments of the exhaust-gas turbocharger according to the invention.

Tests carried out within the context of the invention have shown that the internal flow-guiding spiral surface has a coarse influence on the performance of the turbine or of the compressor owing to its roughness generated by the casting process. Here, it is in particular the final circumferential quarter of the compressor spiral and/or of the turbine spiral that is of crucial significance. It is therefore preferable for said final circumferential quarter to be subjected to a material-removing machining process, in particular a milling machining process, wherein it is basically also possible for the compressor spiral and/or the turbine spiral to be subjected to such machining over its entire length.

Said material-removing machining, in particular the milling machining, yields the already-discussed increase in efficiency, and additionally a reduction in efficiency variance, by providing an improved surface condition.

Further tests carried out within the context of the invention have shown that the tongue spacing between the tongue and wheel of the turbine and/or of the compressor has a decisive influence on the following:

a) the flow housing performance, the throughput and the efficiency; and b) the HCF excitation of the turbine wheel and/or compressor wheel, wherein a smaller spacing leads to a more intense excitation.

The tongue spacing is set according to the invention based on the compromise between the two stated conditions a) and b). In practice however, said tongue spacing is not fixed but rather varies owing to the casting position tolerances in the flow housing. This means that:

In particular, the turbine performance and the HCF excitation of the turbine wheel fluctuate with the tolerance range of the tongue spacing, and superposed with the surface quality of the spiral (of the flow duct).

In particular, if the final circumferential quarter of the spiral is now milled, the tolerance range is reduced by 80%, and the surface quality is much higher than without milling machining This yields the following advantages:

The differences in efficiency of the individual series-produced flow housings are reduced by 80% as regards influences arising from the tongue spacing. At the same time, the series HCF performance is maintained.

The average efficiency of the turbine and/or of the compressor in the series-produced turbine and/or series-produced compressor can be increased:

if, for example, a turbine housing lies in the middle/upper casting tolerance range, this reduces the efficiency;

if the milling tolerance is placed into the lower casting tolerance range, this increases the exhaust-gas turbocharger efficiency in the series process, without the original series HCF limit being undershot. That is to say, the increase in performance is greater the smaller the flow housing is.

If the tongue is milled, the surface quality is simultaneously also increased, because significant imperfections can be milled away. The HCF strength is thus increased significantly. However, if only the original series HCF strength is required, it is possible according to the invention to correspondingly reduce the tongue spacing. A reduction of the tongue spacing by for example 2.5% results in a 1% increase in efficiency.

In a method according to the invention for producing a flow housing of an exhaust-gas turbocharger, the flow housing is firstly cast, and material-removing machining, in particular milling machining, of the internal flow-guiding spiral surfaces is subsequently performed.

In accordance with the results of the tests carried out according to the invention, material-removing machining, in particular milling machining, is performed in particular on the final circumferential quarter up to the end of the tongue of the respective spiral of the flow housing.

It is preferably possible for a disk milling cutter to be used for carrying out the milling process.

Furthermore, in relation to known flow housings, it is possible for the lateral connection radii of the tongue to be enlarged and for the tongue to be formed with a machining allowance.

The flow housing may either be in the form of a compressor housing or in the form of a turbine housing. In the case of an exhaust-gas turbocharger according to the invention, however, it is possible, as defined in claim 1, for milling machining to be performed either only on the compressor housing or only on the turbine housing or on both flow housings.

The method according to the invention can basically be implemented as follows:

A) Emergency remedy in ongoing series production in the event of individual blade damage (HCF performance): The previous approach of turning machining of the tongue generates both an imperfection at the machining engagement location and also a greater efficiency loss, because in the case of turning machining, the tongue radius can only be kept constant. The efficiency loss will be noticeably lower with the implementation of the method according to the invention, which provides milling machining, for example, than with the previously known turning. Furthermore, in the case of milling, no imperfection is generated, which likewise has a positive effect on efficiency.

B) Improvement in efficiency in new housing constructions: The spiral is preferably structurally adapted such that, in its final quarter, its cross-sectional width is less than or equal to the turbine wheel inlet width or diffuser outlet width, and in which the cross-sectional depth decreases to approximately zero.

BRIEF DESCRIPTION OF THE SEVERAL VIEWS OF THE DRAWINGS

Further details, advantages and features of the present invention emerge from the following description of exemplary embodiments with reference to the drawing, in which.

DETAILED DESCRIPTION OF THE INVENTION

Figure 1:
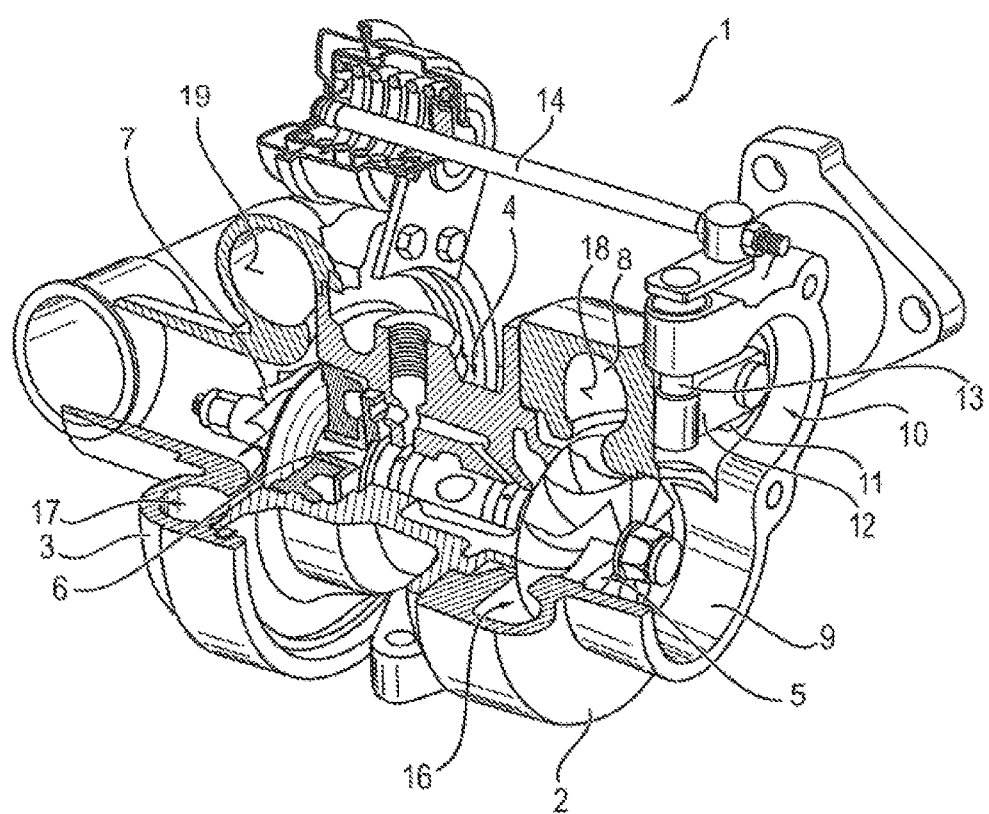
FIG. 1 shows a perspective sectional illustration of one possible embodiment of an exhaust-gas turbocharger according to the invention.

FIG. 1 illustrates an exhaust-gas turbocharger 1 according to the invention which has a turbine housing 2 and a compressor housing 3.

The turbine housing 2 has a turbine spiral 16 which is the flow duct which surrounds a turbine wheel 5 which is arranged in the turbine housing 2.

Correspondingly, the compressor housing 3 has a compressor spiral 17 which is the flow duct which surrounds a compressor wheel 7 of the compressor housing 3.

The turbine spiral 16 has an internal spiral surface 18, and the compressor spiral 17 has an internal spiral surface 19, which according to the invention is subjected, for example, to milling machining As explained in the introduction, it is possible according to the invention for either both spiral surfaces 18 and 19 or in each case only one of said spiral surfaces 18 or 19 to be subjected to milling machining, wherein a milled turbine-side internal flow-guiding spiral surface 18 is preferred.

FIG. 1 shows merely an exemplary embodiment of an exhaust-gas turbocharger 1 which may be designed according to the invention. It is self-evident that, in principle, any other conceivable embodiments of such exhaust-gas turbochargers may conceivably be provided so as to be configured according to the invention. Since the further elements of the exhaust-gas turbocharger 1 that are visible in FIG. 1, and which are denoted by the reference numerals 8 to 15, are not required for the explanation of the principles of the present invention, said elements are merely listed in the following list of reference numerals.

Figure 2:
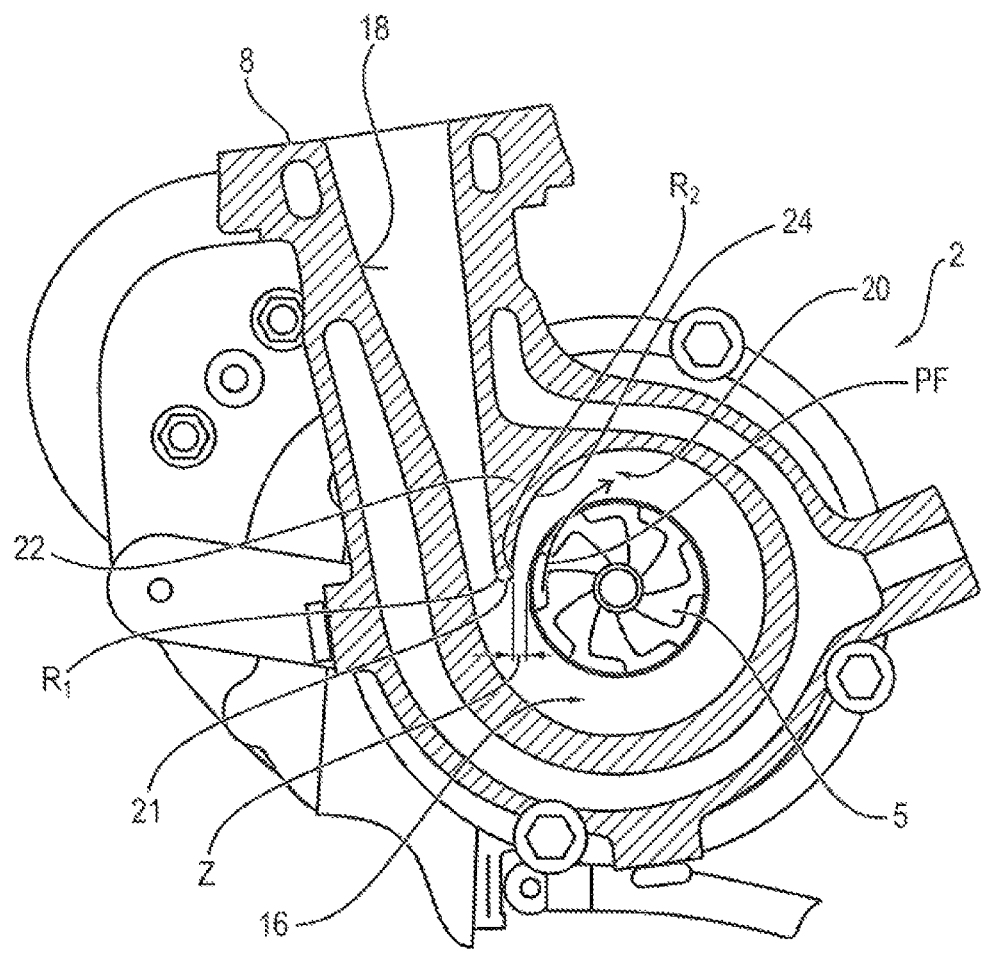
FIG. 2 shows one possible embodiment of a flow housing according to the invention of the exhaust-gas turbocharger, said flow housing being a turbine housing in the example illustrated.

FIG. 2 shows one conceivable embodiment of a turbine housing 2 as a representative of a flow housing of an exhaust-gas turbocharger 1. Also with regard to the embodiment of the turbine housing 2 shown in FIG. 2, it is pointed out that this is merely an exemplary embodiment, and any other design of a turbine housing 2 may likewise have the features according to the invention. Furthermore, it is pointed out that the features that are explained below and visible in FIG. 2 also apply in principle to the compressor housing 3 of the exhaust-gas turbocharger 1.

FIG. 2 illustrates again that the turbine housing 2 has a turbine spiral 16 with an internal flow-guiding spiral surface 18, which leads from a housing inlet 8 to the end 21 of a tongue 22. According to the invention, said internal flow-guiding spiral surface 18 is subjected, for example, to milling machining, wherein in particular the final circumferential quarter 20 to the end 21 of the tongue 22 is subjected to milling machining, because said final circumferential quarter 20 has a particularly crucial influence on the increase in efficiency.

As is also shown in FIG. 2, the tongue 22 may, in the region of the end 21 of the tongue, comprise lateral connection radii $R_1$ and $R_2$ which are of enlarged form in relation to standard housings. This yields a reduced risk of cracking Furthermore, it is possible according to the invention for a thickening 24 of the tongue 22 to be provided in the final circumferential quarter 20 for the material-removing machining, in particular in the case of new constructions.

The resulting tongue spacing Z is also plotted in FIG. 2.

Finally, FIG. 2 shows, by means of the arrow PF, that the path of the milling axis is oriented to the profile of the tongue 22 and the A/R profile thereof.

Figures 3, 4:
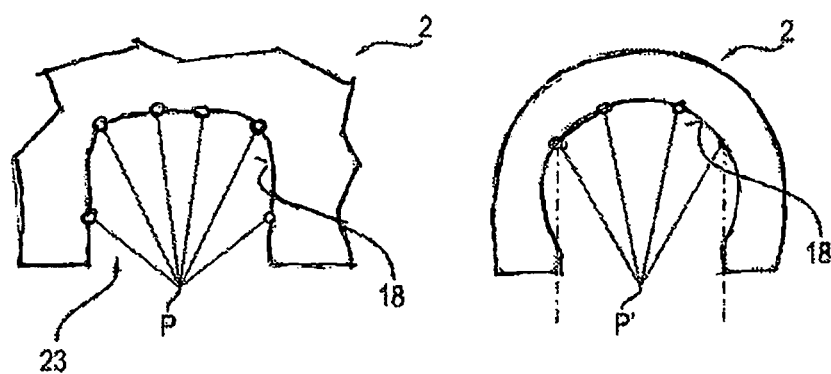
FIG. 3 shows a sectional illustration through an embodiment of a turbine housing according to the invention.
FIG. 4 shows a sectional illustration, corresponding to FIG. 3, of a further embodiment of the turbine housing according to the invention.

FIG. 3 shows a cross-sectional area, that can be realized for example by means of milling machining, in the final circumferential quarter of 20 of the spiral 16 and/or 17. The A/R profile over the circumference of the spiral continues to correspond to the conventional construction and is controlled only by means of the engagement of the milling cutter. The milling regions in the case of a new construction of said type are indicated by the six points P.

FIG. 4 shows a turbine housing with material removal regions P' in the case of an emergency remedy as explained above.

Figure 5:
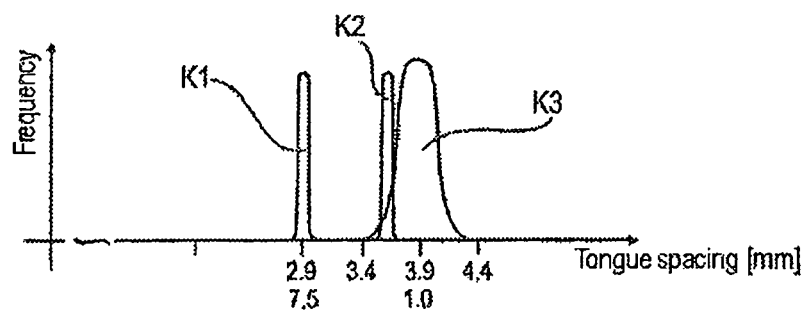
FIG. 5 shows graphs illustrating tolerance ranges for the tongue spacing without milling (casting) and with milling machining

Finally, FIG. 5 shows graphs illustrating tolerance ranges for the tongue section without milling (casting) and with milling machining Here, the curve K1 shows the tolerance range with milling machining, wherein the tongue spacing is reduced.

The curve K2 shows the tolerance range in the case of milling machining without a reduced tongue spacing, and the curve K3 shows the tolerance range without machining (for example in the case of the casting position tolerances in the case of steel casting). It must also be pointed out that the term "HCF configuration" is to be understood to mean a configuration which places the emphasis on a high one-time load, that is to say does not focus on load alternation. The abbreviation "HCF" refers here to "High Cycle Fatigue".

The expression "A/R profile" is to be understood to mean an area profile of a spiral which is characterized as a dimensionless ratio of cross-sectional area at a certain circumferential point and the associated centroid radius.

In addition to the above written description of the invention, reference is hereby explicitly made, for additional disclosure thereof, to the diagrammatic illustration of the invention in FIGS. 1 to 5.

LIST OF REFERENCE SIGNS

1 Exhaust-gas turbocharger
2 Turbine housing
3 Compressor housing
4 Bearing housing
5 Turbine wheel
6 Shaft
7 Compressor wheel
8 Turbine housing inlet
9 Turbine housing outlet
10 Flap arrangement
11 Flap plate
12 Flap lever/spindle
13 Flap shaft
14 Control rod
15 Actuator
16 Turbine spiral
17 Compressor spiral
18 Internal spiral surface of the turbine housing 2
19 Internal spiral surface of the compressor housing 3
20 Final circumferential quarter
21 End of the tongue
22 Tongue
23 Region of the rectangular shape in the final circumferential quarter 20
24 Thickening

The invention claimed is:

1. An exhaust-gas turbocharger (1) having
   a one-piece turbine housing (2) which has a turbine spiral (16) defining an internal flow-guiding spiral surface (18); and
   a one-piece compressor housing (3) which has a compressor spiral (17) defining an internal flow-guiding spiral surface (19),
   wherein
   at least a part of the internal flow-guiding spiral surface (18) of the turbine spiral (16) and/or the internal flow-guiding spiral surface (19) of the compressor spiral (17) is machined in a material-removing process.

2. The exhaust-gas turbocharger as claimed in claim 1, wherein the internal flow-guiding spiral surface (18, 19) is machined in a material-removing process in the final circumferential quarter (20) of the turbine spiral (16) and/or of the compressor spiral (17) in the tongue region (22).

3. The exhaust-gas turbocharger as claimed in claim 1, wherein at least a part of the internal flow-guiding spiral surface (18, 19) of the turbine spiral (16) and/or of the compressor spiral (17) is machined by milling.

4. The exhaust-gas turbocharger as claimed in claim 3, wherein the internal flow-guiding spiral surface (18, 19) of the turbine spiral (16) and/or of the compressor spiral (17) is machined by milling in the final circumferential quarter (20) in the tongue region (22).

5. The exhaust-gas turbocharger as claimed in claim 1, wherein at least a part of the internal flow-guiding spiral surface (18, 19) of the turbine spiral (16) and/or of the compressor spiral (17) is machined by interpolation turning.

6. The exhaust-gas turbocharger as claimed in claim 5, wherein the internal flow-guiding spiral surface (18, 19) is machined by interpolation turning in the final circumferential quarter (20) of the turbine spiral (16) and/or of the compressor spiral (17) in the tongue region (22).

7. The exhaust-gas turbocharger as claimed in claim 1, wherein the cross-sectional width at at least a part of the internal flow-guiding spiral surface (18, 19) of the turbine spiral (16) and/or of the compressor spiral (17) is enlarged no further proceeding from the turbine wheel inlet or diffuser outlet respectively.

8. A method for producing a one-piece flow housing (2; 3) of an exhaust-gas turbocharger (1), having the following method steps:
   casting the one-piece flow housing (2; 3); and
   machining at least a part of the internal flow-guiding spiral surface (18, 19) of the one-piece flow housing (2; 3) in a material-removing process.

9. The method as claimed in claim 8, wherein the internal flow-guiding spiral surface (18, 19) is machined in a material-removing process in the final circumferential quarter (20) of the turbine spiral (16) and/or of the compressor spiral (17) in the tongue region (22).

10. The method as claimed in claim 8, wherein the turbine spiral (16) and/or the compressor spiral (17) are, in the final circumferential quarter (20), designed such that the cross-sectional width is enlarged no further proceeding from the turbine wheel inlet or diffuser outlet respectively.

11. The method as claimed in claim 8, wherein lateral connection radii ($R_1$; $R_2$) of the tongue (22) are of enlarged form at the end (21) of the tongue.

12. The method as claimed in claim 8, wherein the tongue (22) is at least partially thickened in the final circumferential quarter (20).

13. The method as claimed in claim 8, wherein the milling machining is performed by means of a disk milling cutter.

14. The method as claimed in claim 8, wherein the flow housing is a turbine housing (2) and/or a compressor housing (3).

15. The exhaust-gas turbocharger as claimed in claim 1, wherein the internal flow-guiding spiral surface (18, 19) is machined in a material-removing process in the final circumferential quarter (20) of the turbine spiral (16) and/or of the compressor spiral (17) at the end (21) of the tongue.

16. The exhaust-gas turbocharger as claimed in claim 3, wherein the internal flow-guiding spiral surface (18, 19) of the turbine spiral (16) and/or of the compressor spiral (17) is machined by milling in the final circumferential quarter (20) at the end (21) of the tongue.

17. The exhaust-gas turbocharger as claimed in claim 5, wherein the internal flow-guiding spiral surface (18, 19) is machined by interpolation turning in the final circumferential quarter (20) of the turbine spiral (16) and/or of the compressor spiral (17) at the end (21) of the tongue.

* * * * *